US012604882B2

(12) United States Patent
Volmy

(10) Patent No.: US 12,604,882 B2
(45) Date of Patent: Apr. 21, 2026

(54) PORTABLE LAWN TOOL FOR PULLING WEEDS

(71) Applicant: Jean Lophard Volmy, Port Saint Lucie, FL (US)

(72) Inventor: Jean Lophard Volmy, Port Saint Lucie, FL (US)

( * ) Notice: Subject to any disclaimer, the term of this patent is extended or adjusted under 35 U.S.C. 154(b) by 393 days.

(21) Appl. No.: 18/330,693

(22) Filed: Jun. 7, 2023

(65) Prior Publication Data

US 2024/0276970 A1      Aug. 22, 2024

Related U.S. Application Data

(60) Provisional application No. 63/486,328, filed on Feb. 22, 2023.

(51) Int. Cl.
*A01M 21/02*          (2006.01)
(52) U.S. Cl.
CPC .................................. *A01M 21/02* (2013.01)
(58) Field of Classification Search
CPC ..................................................... A01M 21/02
USPC ...................................................... 171/26–42
See application file for complete search history.

(56) References Cited

U.S. PATENT DOCUMENTS 6,938,937 B1     9/2005   Kinney

FOREIGN PATENT DOCUMENTS

| CN | 114532324 | A | * | 5/2022 | ............. B01D 46/12 |
| DE | 202022001391 | U1 | * | 7/2022 | ........... G06V 10/764 |
| JP | 2000041401 | A | | 2/2000 | |
| JP | 2003125627 | A | * | 5/2003 | |
| JP | 2008193925 | A | | 8/2008 | |

OTHER PUBLICATIONS

Zhang et al., "Agricultural Weeding And Maintaining Field-returning Device For Intelligent" (CN 114532324 A), machine translation, pp. 1-19 (Year: 2022).*
Johanning et al., "Autonomously Operating Device For Removing Weeds In Horizontal Joints" (DE 2020 22001391 U1), machine translation, pp. 1-6. (Year: 2022).*
Matsukawa et al., "Powered Implement and Weed Mower" (JP 2003125627 A), machine translation, pp. 1-11. (Year: 2003).*

* cited by examiner

*Primary Examiner* — Tara Mayo
(74) *Attorney, Agent, or Firm* — Kaustubh Nadkarni; Nadkarni Law PLLC

(57) ABSTRACT

The present invention relates to a portable lawn tool for pulling weeds from the root using vacuum pressure. The lawn tool includes a body comprising a top portion and a bottom portion. A plurality of roller brushes are provided on the bottom portion of the body. A plurality of vacuum ports are provided on the bottom portion for providing the vacuum pressure. The plurality of roller brushes and the plurality of vacuum ports allows for the weeds to be removed from the root. A set of pivot mounts are attached to the top portion of the body on the left rear end and right rear end respectively through a set of pivot posts. A first end of a set of extending arms is connected to a handle and a second end of the set of extending arms is connected to the set of pivot mounts.

18 Claims, 5 Drawing Sheets

PORTABLE LAWN TOOL FOR PULLING WEEDS

CLAIM FOR PRIORITY

This utility patent non-provisional application claims priority from a prior utility patent provisional application 63/486,328 filed on Feb. 22, 2023. The entire collective teachings thereof being herein incorporated by reference.

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A SEQUENCE LISTING, A LARGE TABLE, OR A COMPUTER PROGRAM LISTING APPENDIX ON READ-ONLY OPTICAL DISC (IF APPLICABLE)

Not Applicable.

FIELD OF THE INVENTION

The present invention generally relates to lawn tools. More particularly, the present invention relates to a lawn tool for pulling weeds from the root using vacuum pressure, thereby effectively and economically removing the weeds around the pavers, brick pathways, and driveways.

BACKGROUND OF THE INVENTION

Thymes or other low-growing plants are deliberately planted around the pavers, brick pathways, and driveways to add interest. However, many unwelcome weeds find their way into paving. The unwanted vegetative growth of weeds in the cracks and less worn areas between the paving makes the paving uneven, untidy, and even slippery when wet. These weeds growing up between pavers is a constant and ongoing problem as weeds can harbor problem such as insects, absorb valuable nutrients and moisture, and requires a constant cost of cleaning and maintenance.

Weeds are not good for lawns because they deprive the grass of the nutrients they need to thrive. Weeds can sap nitrogen from the soil, suck up valuable water, and bully the grass from catching enough sunlight by taking up space. For a home garden or vegetable patch, weeds can weaken your crops and make them more susceptible to disease and predatory pests.

To avoid damage to your precious plants in the home garden, it is important to keep the area clear of any unwanted weeds. They not only compete with the plants for nutrients, light, and water, but also harbor diseases that could spread to the garden plants. Some invasive type of weeds such as bindweed and ground elder can easily swamp the garden when left unchecked.

A variety of weed control methods have been employed using non-chemical means such as digging out or other methods like burning or the application of hot water. However, these practices do not yield promising results as weed seeds can lie dormant for years, resulting in repeated growth.

While hand pulling is the simplest method to remove weeds from the lawn or garden, it is only effective against smaller weeds with shorter roots. It also assumes that a person can spend extended periods of time on their knees, reaching for and pulling weeds. For anything else, there is most likely a necessity to have a weeding tool of some kind.

Many devices have been developed for removing weeds from vertical and horizontal surfaces. Typically, weed removal devices employ cutter blades, and the cut objects are required to be manually removed. The cost of labor associated with manual cleaning has placed a requirement on the development of new cleaning processes as well as on machines that clean in one rather than multiple passes.

To fulfill this need in the market, many weed removal devices are disclosed in the prior art that primarily employs rotating brushes in combination with suction for the collection of scrapped weeds. The weeds which have been grown are scraped up by the rotating brush and removed and discharged together with dirt, pebbles, and the like. The weed and dirt and the like discharged are sucked under negative pressure by vacuum and accommodated in a dust container in the weed removal machine.

As the weeds are scrapped from the surface with the brushes, the weeds tend to regrow quickly with persistent roots being inside. A spray of herbicides may be required after scrapping the weeds, which imparts additional costs and toxicity.

An invention disclosed in the prior art as a device for removing weeds (Japanese prior art No. JP2008193925). The device for removing the weeds comprises a sandblast device for jetting sand at high pressure, a dust-collecting device for sucking the weeds, a driving device consisting of an electric power generator and a compressor loaded on a stage vehicle capable of moving. A weed-removing unit is connected to the device body with a pipe. The device removes the weeds by the jetting pressure of the sand from a sand-blasting nozzle and sucking them with the dust-collecting device. However, this device consumes a lot of power to create a jetting pressure of the sand to remove weeds. As such, this invention in the prior art is severely limited and unable to fulfill all the needs related to a portable lawn tool for removing weeds from the root using vacuum pressure.

Another invention disclosed in the prior art as a weed rooting-up device (Japanese prior art No. JP2000041401A). This weed rooting-up device nips a weed and pulls it out. In the case of working a pulling-up the weed, the stem of the weed is held on a nipping tip and a grasping power is applied to a first holding part, then the stem is nipped with the nipping tip. When the nipping tip nips the stem of the weed, an inside holding part is pulled without removing the grasping power. A nipping power is generated at a joint pin part of the nipping tip and a second nipping tip lever as a fulcrum to add onto the nipping tip in adding to the grasping power, and the added force vanishes when the stem is pulled up. However, this prior art requires manual power to pull out weeds from roots causing considerable labor and further consuming more time to pull out every weed. As such, this invention found as a prior art is severely limited and unable to fulfill all the needs related to a portable lawn tool for removing weeds from the root using vacuum pressure.

Another invention disclosed in the prior art as a weed removal device (U.S. Pat. No. 6,938,937B1). This prior patent discloses a weed removal tool for selectively engaging, gripping, and removing a weed from the ground. The weed extraction device utilizes an elongated handle with a remotely operable weed engagement jaw on an angular offset ground engagement end. A jaw activation lever pivotally extends from the handle that also becomes a fulcrum after the jaw closes on the weed to remove the weed from the ground after it has been electively gripped in one continuous motion. However, this prior art requires manual manipulation and operation of the engaging means causing considerable labor and further consuming more time to pull out every weed. Furthermore, due to the varying characteristics of weeds and their root systems, manual grabbing and pulling action alone are often insufficient for the complete removal of root from weeds, which can result in the regrowth of weeds. As such, this invention found as a prior art is severely limited and unable to fulfill all the needs related to a portable lawn tool for removing weeds from the root using vacuum pressure.

Accordingly, it is apparent that a need exists for a portable weed removal tool capable of removing weeds from the root efficiently with less effort that can resolve many of the challenges of the existing weed removing devices.

BRIEF SUMMARY OF THE INVENTION

According to the first aspect of the invention, a portable lawn tool for pulling weeds is provided. The lawn tool includes a tapered-shaped body comprising a top portion and a bottom portion, a plurality of wheels, a plurality of roller brushes, a plurality of vacuum ports, a hose, a waste compartment, a shaft, a set of pivot mounts, a set of pivot posts, a set of extending arms, a handle, a set of handlebars and a set of braking means.

The plurality of wheels provided on the bottom portion of the tapered-shaped body supports the lawn tool in a horizontal position with respect to the ground and includes a front wheel rotatably connected at the front end of the tapered-shaped body and two rear wheels, each connected at the rear end corners of the tapered-shaped body.

The plurality of roller brushes comprises one front roller brush and two rear roller brushes. The plurality of roller brushes and the plurality of vacuum ports provided on the bottom portion of the tapered-shaped body allow for weeds to be removed from the root. The removed weeds are collected in the waste compartment through the hose which is provided as a slender tube.

The waste compartment is located at the rear end symmetrically in-line with the center of the top portion and attached to the bottom portion of the tapered-shaped body with a shaft. The waste compartment includes an opening for the entry of the hose.

The set of pivot mounts is attached to the top portion of the tapered-shaped body one on the left rear end and the other on the right rear end through the set of pivot posts. The set of pivot mounts provides rigidity and strength to the lawn tool, thus helping to reduce the chance of misalignment of the lawn tool.

The set of extending arms includes integral telescopic adjustment shafts for complete vertical adjustment of the lawn tool. The first end of the set of extending arms is connected to the handle and the second end of the set of extending arms is connected to the set of pivot mounts. The set of handlebars is attached to either side of the handle. The set of braking means is attached to the set of handlebars to stop the movement of the lawn tool upon requirement.

The present invention provides an easy way to remove weeds from the root with the help of the plurality of roller brushes and the plurality of vacuum ports. The lawn tool facilitates the user to efficiently and comfortably pull out the weeds, thereby reducing the time and frustration linked to manually pulling weeds from the pavers, brick pathways, and driveways. The lawn tool can be powered with a power source, including a battery.

The present invention is fully adjustable with telescopic folding handlebars for providing maximum comfort to the user.

BRIEF DESCRIPTION OF THE SEVERAL VIEWS OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

Like reference numerals refer to like parts throughout the several views of the drawings.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising." when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A portable lawn tool for pulling weeds is discussed herein. In the following description, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention and is not intended to limit the invention to the specific embodiments illustrated by the figures or description below.

The present invention will now be described by referencing the appended figures representing preferred embodiments.

Figure 1:
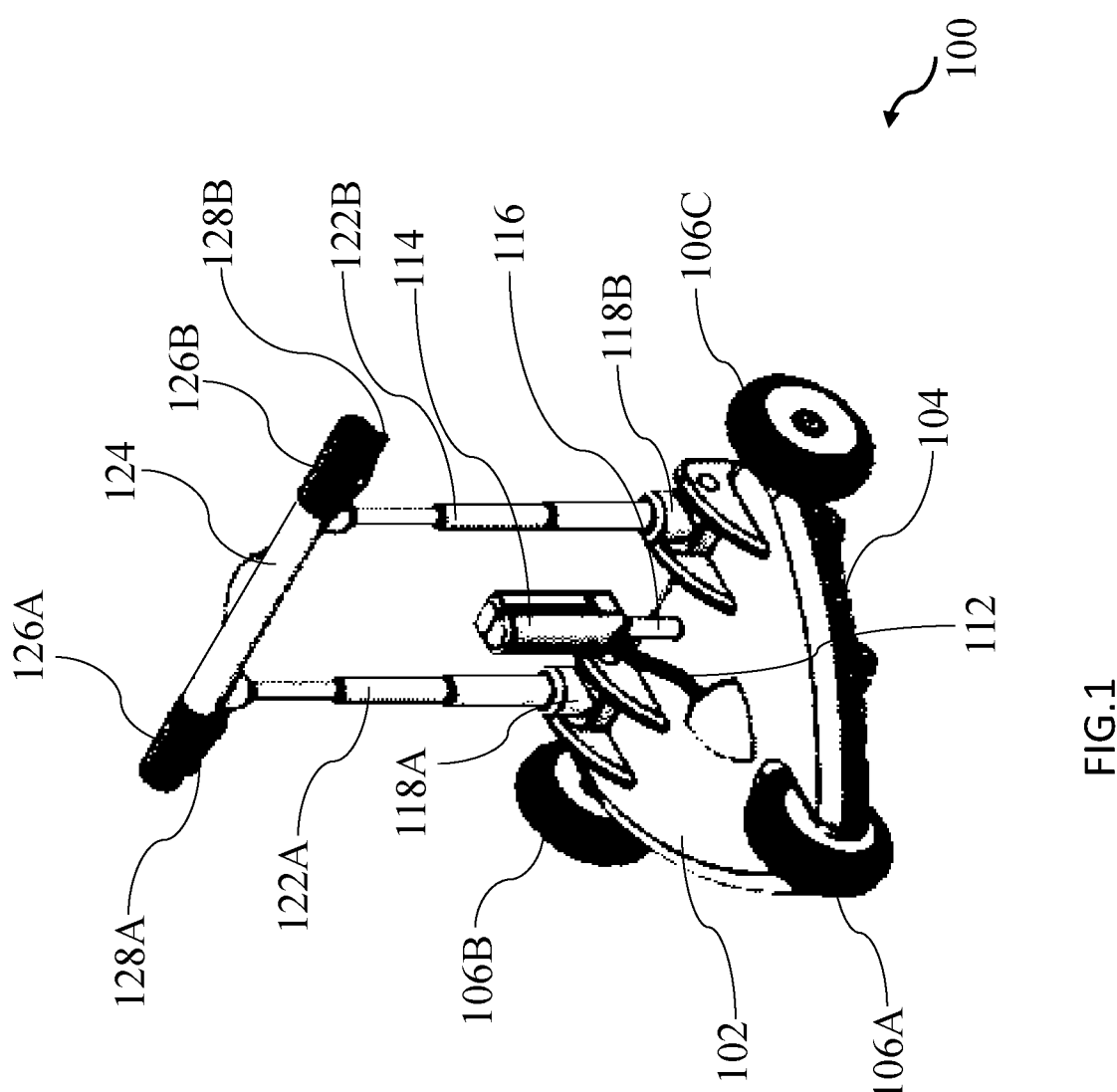
FIG. 1 illustrates a portable lawn tool for pulling weeds according to various embodiments of the present invention.

FIG. 1 illustrates a portable lawn tool for pulling weeds according to various embodiments of the present invention. The lawn tool 100 for pulling weeds includes a tapered-shaped body including a top portion 102 and a bottom portion 104, a plurality of wheels 106A-C, a plurality of roller brushes 108A-C, a plurality of vacuum ports 110A-G, a hose 112, a waste compartment 114, a shaft 116, a set of pivot mounts 118A-B, a set of pivot posts 120A-B, a set of extending arms 122A-B, a handle 124, a set of handlebars 126A-B and a set of braking means 128A-B.

FIG. 1 further illustrates the plurality of wheels 106A-C supports the lawn tool 100 in a horizontal position with respect to the ground with a front wheel 106A rotatably connected at the front end of the tapered-shaped body and two rear wheels 106B and 106C connected at the rear end corners of the tapered-shaped body.

FIG. 1 further illustrates the plurality of roller brushes 108A-C includes one front roller brush 108A and two rear roller brushes 108B and 108C. The plurality of roller brushes 108A-C and the plurality of vacuum ports 110A-G provided on the bottom portion 104 of the tapered-shaped body allows for weeds to be removed from the root. The removed weeds are collected in the waste compartment 114 through the hose 112 which is provided as a slender tube.

FIG. 1 further illustrates the waste compartment 114 is located at the rear end symmetrically in-line with the center of the top portion 102 and attached to the bottom portion 104 of the tapered-shaped body with a shaft 116. The waste compartment 114 includes an opening for the entry of the hose 112. The set of pivot mounts 118A-B is attached with the top portion 102 of the tapered-shaped body one on the left rear end and the other on the right rear end through the set of pivot posts 120A-B. The set of pivot mounts 118A-B provides rigidity and strength to the lawn tool 100, thus helping to reduce the chance of misalignment of the lawn tool 100. The set of extending arms 122A-B includes integral telescopic adjustment shafts for complete vertical adjustment of the lawn tool 100. The first end of the set of extending arms 122A-B is connected to the handle 124 and the second end of the set of extending arms 122A-B is connected to the set of pivot mounts 118A-B. The set of handlebars 126A-B is attached to either side of the handle 124.

FIG. 1. further illustrates the set of braking means 128A-B is attached to the set of handlebars 126A-B to stop the movement of the lawn tool 100 upon requirement. The lawn tool 100 may be powered by a battery and a switch may be provided to activate the lawn tool 100 for performing the operations.

In some other preferred embodiments, the tapered-shaped body including the top portion 102 and the bottom portion 104, the plurality of wheels 106A-C, the waste compartment 114, the set of pivot mounts 118A-B, the handle 124, and the set of handlebars are made-up of nylon material and manufactured using an injection molding process. In some embodiments, the hose 112 is made-up of rubber material and manufactured using the injection molding process.

In some other preferred embodiments, the set of pivot posts 120A-B is made-up of polystyrene material and manufactured using cut to length process. In some embodiments, the set of extending arms 122A-B is made-up of chrome-plated steel and manufactured using the cut to length process.

Figure 2:
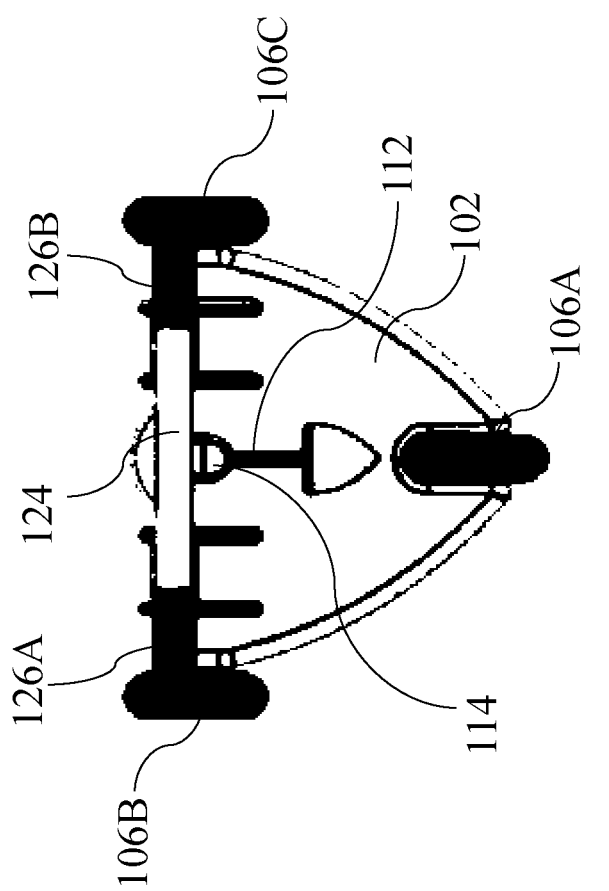
FIG. 2 illustrates the top view of the lawn tool of FIG. 1 for pulling weeds according to various embodiments of the present invention.

FIG. 2 illustrates top view of the lawn tool of FIG. 1 for pulling weeds according to various embodiments of the present invention. The top view 200 shows the top portion 102 of the tapered-shaped body, the plurality of wheels 106A-C, the hose 112, the waste compartment 114, the handle 124, and the set of handlebars 126A-B.

Figure 3:
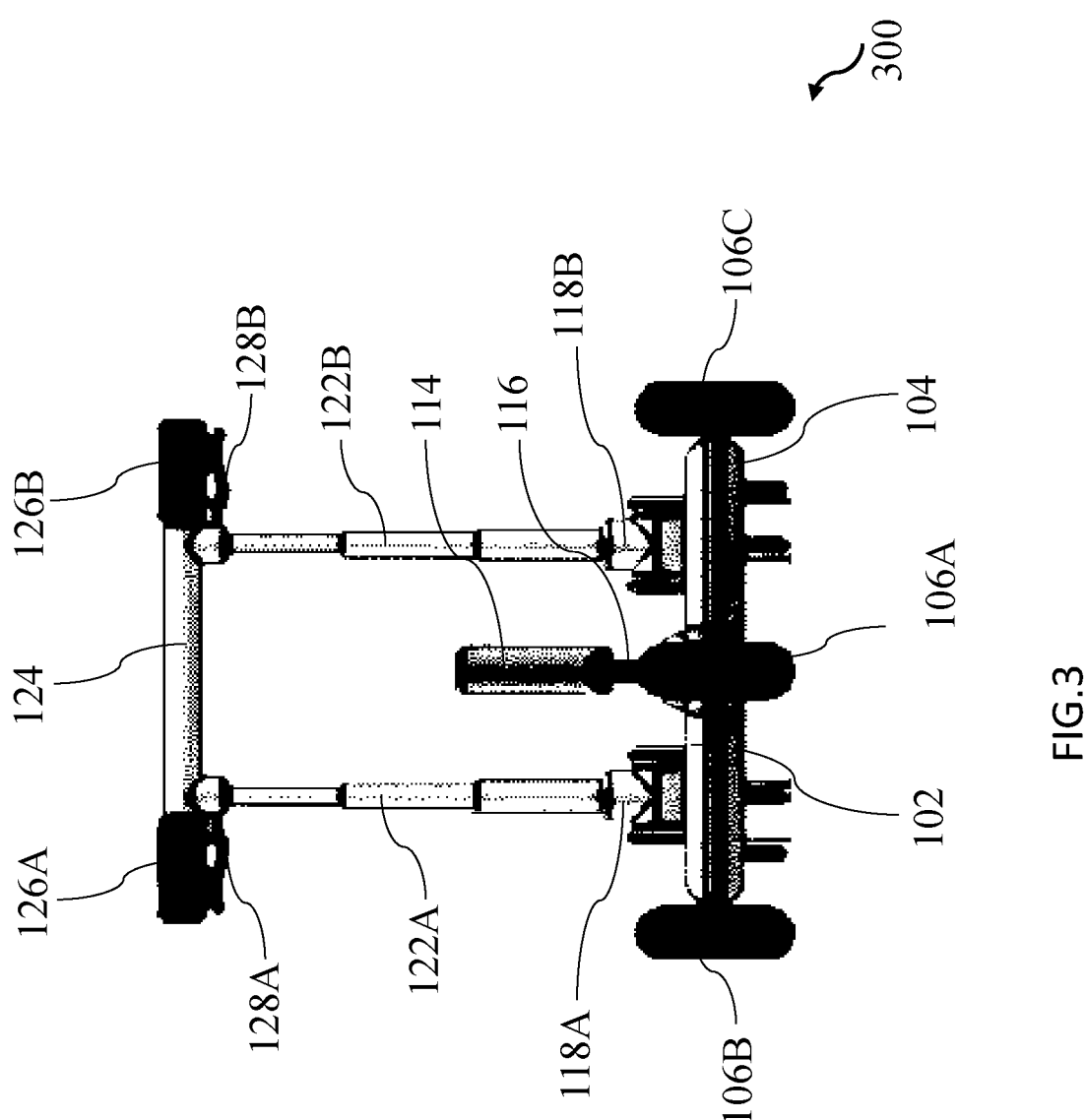
FIG. 3 illustrates the front view of the lawn tool of FIG. 1 for pulling weeds according to various embodiments of the present invention.

FIG. 3 illustrates front view of the lawn tool of FIG. 1 for pulling weeds according to various embodiments of the present invention. The front view 300 shows the top portion 102 and the bottom portion 104 of the tapered-shaped body, the plurality of wheels 106A-C, the waste compartment 114, the shaft 116, the set of pivot mounts 118A-B, the set of extending arms 122A-B, the handle 124, the set of handlebars 126A-B and the set of braking means 128A-B.

Figure 4:
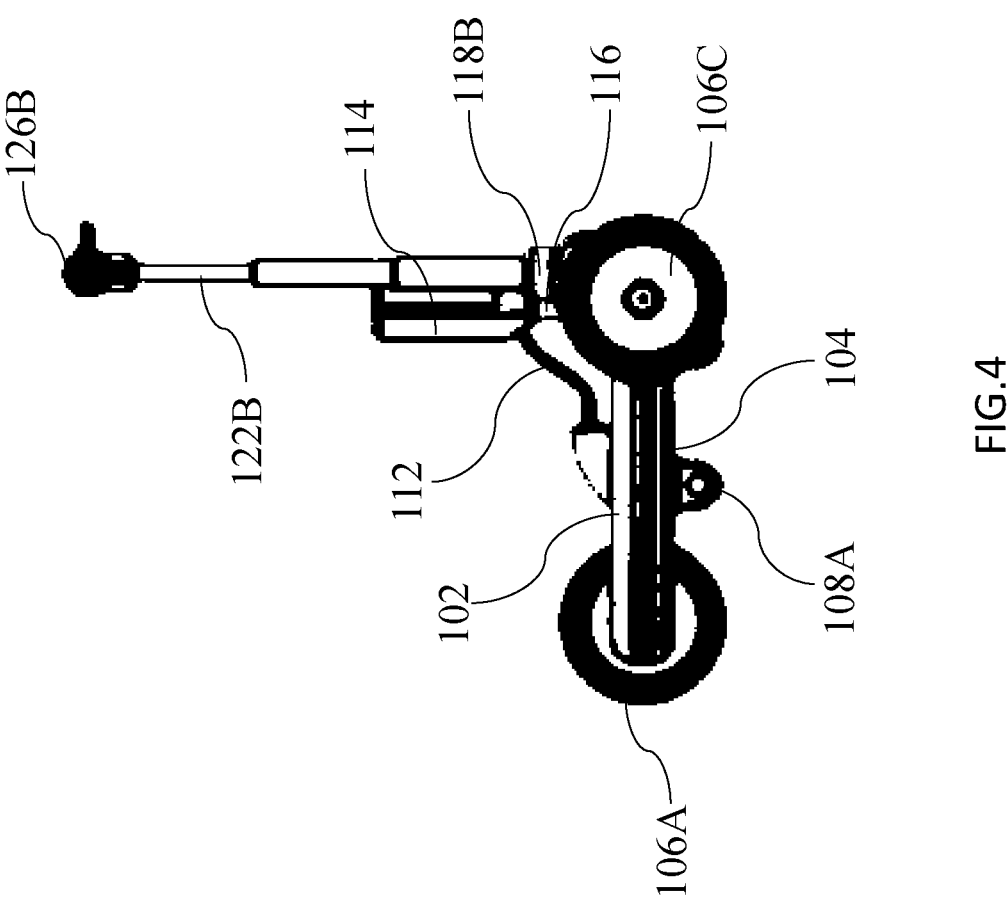
FIG. 4 illustrates the left-side view of the lawn tool of FIG. 1 for pulling weeds according to various embodiments of the present invention.

FIG. 4 illustrates left-side view of the lawn tool of FIG. 1 for pulling weeds according to various embodiments of the present invention. The left-side view 400 shows the top portion 102 and the bottom portion 104 of the tapered-shaped body, the wheels 106A and 106C, the roller brush 108A, the waste compartment 114, the shaft 116, the hose 112, the pivot mount 118B, the extending arm 122B, the handlebar 126B.

Figure 5:
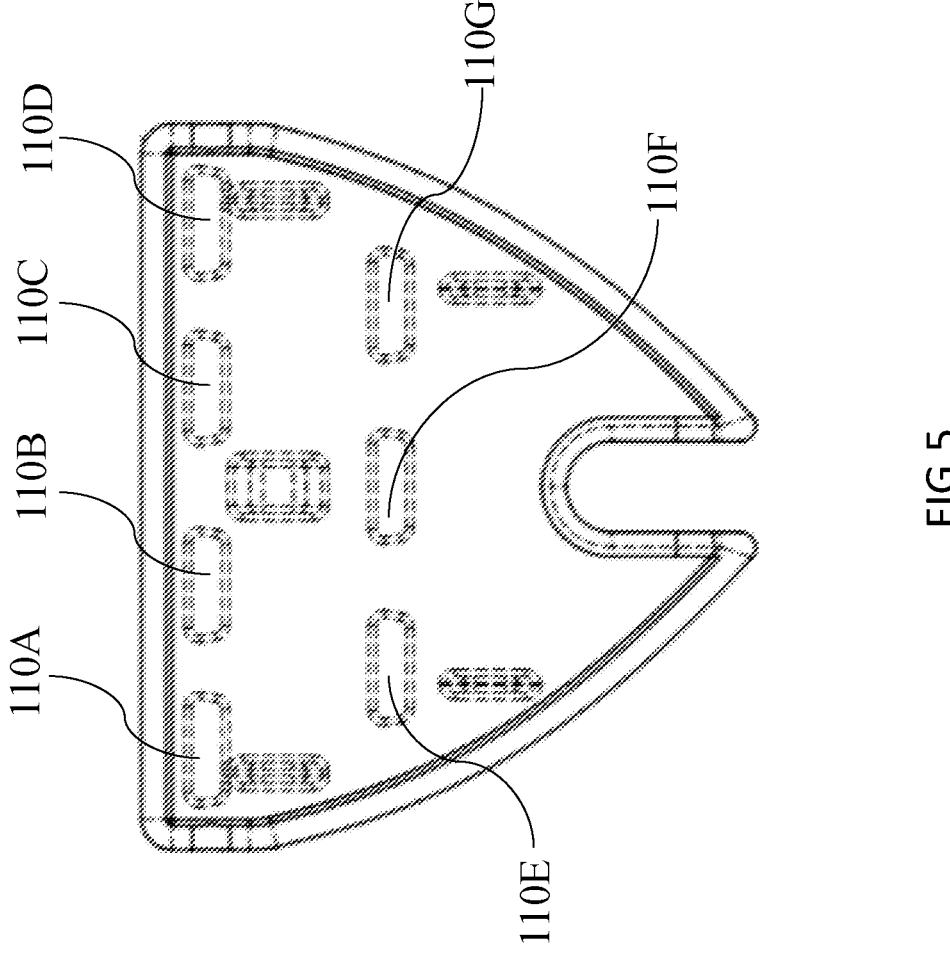
FIG. 5 illustrates the plurality of vacuum ports of the lawn tool of FIG. 1 for pulling weeds according to various embodiments of the present invention.

FIG. 5 illustrates the plurality of vacuum ports 110A-G of the lawn tool of FIG. 1 for pulling weeds according to various embodiments of the present invention. Vacuum pressure is applied through the plurality of vacuum ports 110A-G for pulling the weeds from the root.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of the present invention.

What is claimed is:

1. A portable lawn tool for pulling weeds from root using vacuum pressure, wherein the lawn tool comprises:
   a body comprising a top portion and a bottom portion;
   a plurality of roller brushes provided on the bottom portion of the body, wherein the plurality of roller brushes comprise one front roller brush and two rear roller brushes;
   a plurality of vacuum ports on the bottom portion of the body for providing the vacuum pressure,
   wherein the plurality of roller brushes and the plurality of vacuum ports allows for the weeds to be removed from the root;
   a set of pivot mounts attached with the top portion of the body on left rear end and right rear end respectively through a set of pivot posts; and a set of extending arms, wherein a first end of the set of extending arms is connected to a handle and a second end of the set of extending arms is connected to the set of pivot mounts.

2. The portable lawn tool of claim 1, wherein a waste compartment is provided at rear end symmetrically in-line with center of the top portion, wherein the waste compartment is attached to the bottom portion of the body with a shaft.

3. The portable lawn tool of claim 2, wherein removed weeds are collected in the waste compartment through a hose provided as a slender tube made of a rubber material.

4. The portable lawn tool of claim 1, wherein the set of extending arms comprises integral telescopic adjustment shafts to facilitate vertical adjustment of the lawn tool.

5. The portable lawn tool of claim 1, wherein a set of handlebars are attached to either side of the handle, wherein a set of braking means are attached to the set of handlebars.

6. The portable lawn tool of claim 5, wherein the set of handlebars are made-up of nylon material.

7. The portable lawn tool of claim 1, wherein a plurality of wheels are provided on the bottom portion of the body, wherein the plurality of wheels comprises a front wheel connected at front end of the body and two rear wheels connected at the rear end corners of the body.

8. The portable lawn tool of claim 1, wherein the body comprising the top portion and the bottom portion is taper shaped.

9. The portable lawn tool of claim 1, wherein the set of pivot posts are made-up of polystyrene material, wherein the set of extending arms are made-up of chrome-plated steel.

10. The portable lawn tool of claim 1, wherein the portable lawn tool is powered by a battery.

11. The portable lawn tool of claim 1, wherein a switch is provided in the lawn tool to activate the lawn tool for performing operations.

12. A portable lawn tool for pulling weeds from root using vacuum pressure, wherein the lawn tool comprises:

a tapered-shaped body comprising a top portion and a bottom portion;

a plurality of roller brushes comprising one front roller brush and two rear roller brushes provided on the bottom portion of the tapered-shaped body;

a plurality of vacuum ports on the bottom portion for providing the vacuum pressure, wherein the plurality of roller brushes and the plurality of vacuum ports allows for the weeds to be removed from the root;

a waste compartment provided at rear end symmetrically in-line with center of the top portion, wherein removed weeds are collected in the waste compartment through a hose;

a set of pivot mounts attached with the top portion of the tapered-shaped body on left rear end and right rear end respectively through a set of pivot posts;

a set of extending arms, wherein a first end of the set of extending arms is connected to a handle and a second end of the set of extending arms is connected to the set of pivot mounts; and a plurality of wheels provided on the bottom portion of the tapered-shaped body, wherein the plurality of wheels comprises a front wheel connected at front end of the tapered-shaped body and two rear wheels connected at the rear end corners of the tapered-shaped body.

13. The portable lawn tool of claim 12, wherein the waste compartment is attached to the bottom portion of the tapered-shaped body with a shaft.

14. The portable lawn tool of claim 12, wherein the set of extending arms comprises integral telescopic adjustment shafts to facilitate vertical adjustment of the lawn tool.

15. The portable lawn tool of claim 12, wherein a set of handlebars are attached to either side if the handle, wherein a set of braking means are attached to the set of handlebars.

16. The portable lawn tool of claim 15, wherein the set of handlebars are made-up of nylon material.

17. The portable lawn tool of claim 12, wherein the hose is provided as a slender tube made of a rubber material.

18. The portable lawn tool of claim 12, wherein the set of pivot posts are made-up of polystyrene material, wherein the set of extending arms are made-up of chrome-plated steel.

\* \* \* \* \*